Figure 1:
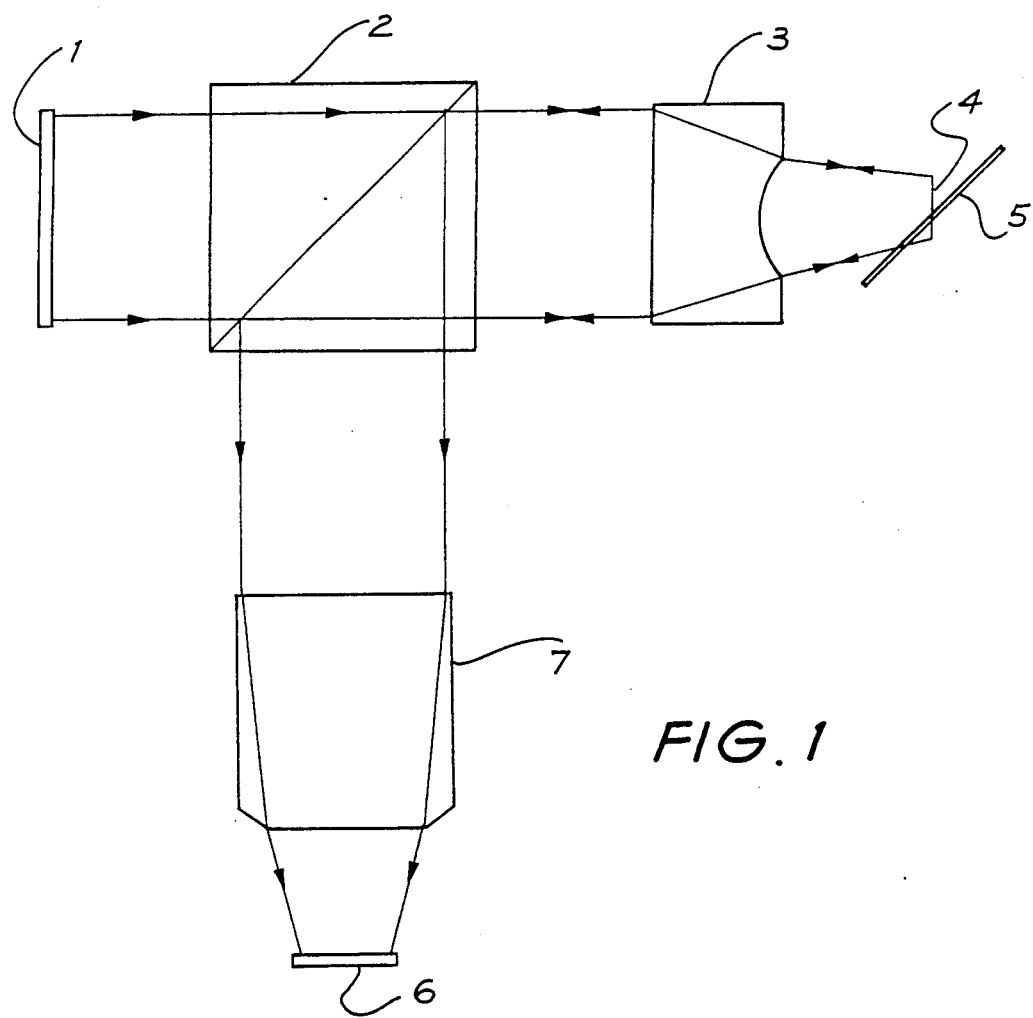

United States Patent [19]

Dabbs et al.

[11] Patent Number: 5,054,926
[45] Date of Patent: Oct. 8, 1991

[54] DISTANCE MEASURING DEVICE

[75] Inventors: Timothy P. Dabbs; Zoltan S. Hegedus; Graham J. Higgerson, all of New South Wales, Australia

[73] Assignee: Commonwealth Scientific and Industrial Research Organisation, Campbell, Australia

[21] Appl. No.: 327,915

[22] PCT Filed: Mar. 24, 1988

[86] PCT No.: PCT/AU88/00084
§ 371 Date: Dec. 13, 1988
§ 102(e) Date: Dec. 13, 1988

[87] PCT Pub. No.: WO88/07657
PCT Pub. Date: Oct. 6, 1988

[30] Foreign Application Priority Data

Mar. 24, 1987 [AU] Australia ................. PI1044
Oct. 7, 1987 [AU] Australia ................. PI4749

[51] Int. Cl.$^5$ .................. G01B 11/14; G01B 11/24
[52] U.S. Cl. ............................ 356/345; 356/376
[58] Field of Search .............. 356/376, 375, 237

[56] References Cited

U.S. PATENT DOCUMENTS

| | | | |
|---|---|---|---|
| 4,548,504 | 10/1985 | Morander | 356/375 |
| 4,626,103 | 12/1986 | Feldman et al. | 356/363 |
| 4,650,333 | 3/1987 | Crabb et al. | 356/376 |
| 4,657,393 | 4/1987 | Stern | 356/376 |

FOREIGN PATENT DOCUMENTS

| | | | |
|---|---|---|---|
| 48795/79 | 7/1979 | Australia. | |
| 0160781 | 2/1985 | European Pat. Off. | |
| 56-133602 | 10/1981 | Japan | 356/376 |
| 2158228A | 11/1985 | United Kingdom. | |

Primary Examiner—Richard A. Rosenberger
Assistant Examiner—K. P. Hantis
Attorney, Agent, or Firm—Nixon & Vanderhye

[57] ABSTRACT

An electro-optic distance or profile measuring device focusses an energy beam into a line (4) which intersects a surface (5) under examination at at least one point. The energy scattered by the surface (5) is imaged onto a detector (6) whereby analysis of the image intensity distribution provides a measure of the distance from a reference point to the intersection point. The focussing means may be an astigmatic confocal microscope (3) which is confocal in one dimension. The energy beam may be light, other electromagnetic radiation, particle beams or a acoustic waves.

18 Claims, 2 Drawing Sheets

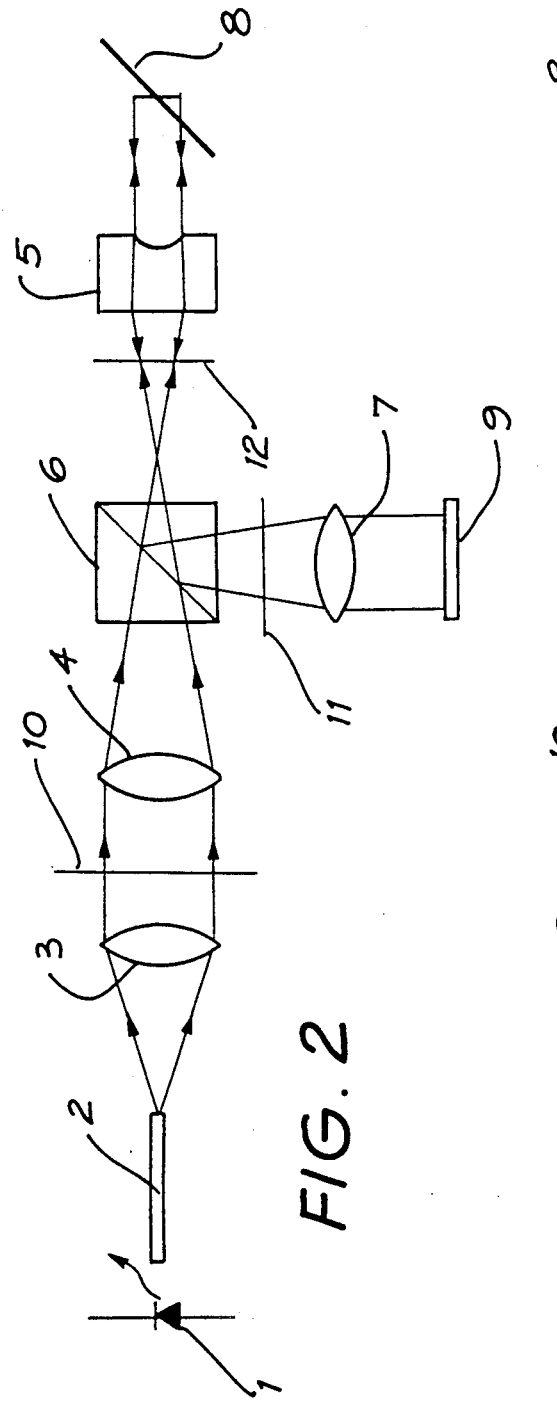
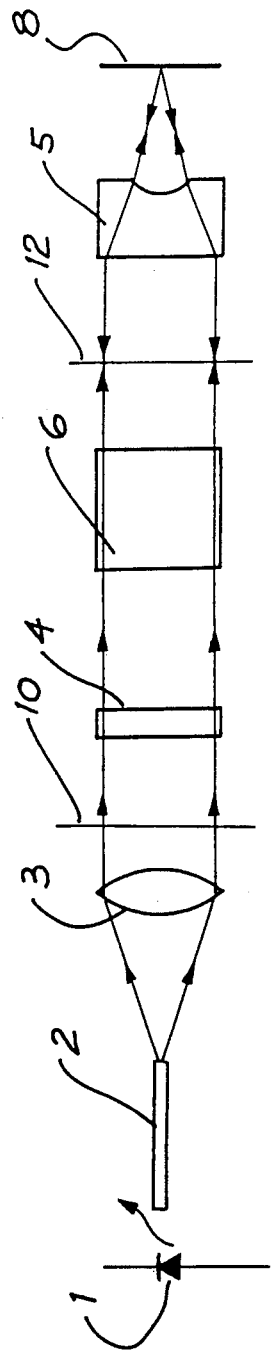
FIG. 2
FIG. 3

DISTANCE MEASURING DEVICE

This invention relates to the field of measurement of distances and more particularly to rapid non-contact distance measurement. It is particularly well suited to measuring the profile of a moving surface; accurately measuring the distance to an object; measuring the thickness of an object by means of two measuring heads; and measuring the shape of simple objects.

Most commercial profilers work by dragging a stylus across the surface of the object to be profiled. These devices suffer from the problem that they may alter or damage the surface as a result of their passage. The invention described hereunder, being a non-contact device, does not suffer from this problem.

Many non-contact distance measuring devices, whether used for profilometry or distance measurement, rely on fringe counting. As a result, when step changes in the height or distance occur, they lose track of the absolute distance. The present device is able to keep track of the absolute distance within a broad range.

Another problem common to non-contact height measuring devices is that while their height resolution is good, their lateral resolution generally is not. This becomes important when the surface being measured is very rough or when the height cf a small element of surface is required. The current invention combines good lateral resolution with good height resolution.

The range of techniques for measuring surfaces is discussed in "Surface Metrology Instrumentation" by D. J. Whitehouse (J. Phys. E: Sci. Instrum. 20 (1987) pages 1145–1155). Various non-contact measurement arrangements are disclosed in "Optical Profilometer for Measuring Surface Contours of 1 to 150 Microns Depth" by H. P. Kleinknecht and H. Meier (Laboratories RCA, Ltd., Zurich, Switzerland); "Electro-Optic Surface Profiler by J. W. Buechele and N. B. Seebe" (IBM Technical Disclosure Bulletin Vol 26 No. 3B August 1983); "Surface Profile Measurement with a Dual-Beam Optical System" by David Y. Lou et al. (Applied Optics Vol. 23, No. 5 of Mar. 1, 1984, pages 746–751); "Optical Profilometer: A Practical Approximate Method of Analysis" by Marek Dobosz (Applied Optics, Vol. 22, No. 24, Dec. 15, 1983, page 3983).

For almost all height measuring devices and profilers, both contact and non-contact, the relative velocity between the instrument sensing point and the surface being measured must be relatively low in order to measure the surface profile with adequate accuracy. The present invention is able to operate with high relative velocities while measuring the surface position. This makes it ideal for surface profilometry or positioning in a manufacturing environment, where speed is important.

While the present invention, in one form, employs one aspect of the standard confocal microscope for its operation, it differs in an important aspect, it is confocal in only one dimension. In the standard confocal microscope, if the surface is moved in a plane perpendicular to the axis of the microscope, small surface height variations result in large signal intensity variations, in comparison with conventional microscopes, at the detector. For the detector signals to ge amenable to analysis these height variations must be limited to a small range. That is, the conventional confocal microscope gives sub wavelength height resolution within wavelength range.

The operation of confocal microscopes is well understood as exemplified by the disclosures in "Experimental Observations of the Depth- Discrimination Properties of Scanning Microscopes" by D. K. Hamilton et al. (Vol. 6, No. 12 Optics Letters of December 1981) and "Surface Profile Measurement using the Confocal Microscope" by D. K. Hamilton and T. Wilson (J. Appl. Phy Vol. 53, No. 7, July 1982, page 5320 et seq.). In the present invention, the measuring range is extended to correspond to the length of the line of illumination. A paper entitled "Optisch-Beruhrunqslose Antastung mit Hilfe des Astiqmatismusuerfahrens" by R. Theska (Feingeratetechnik, Vol. No. 36 (1987), No. 6, pages 263-6) published after the earliest priority date of the present application, discusses the use of astigmatism for contactless optical sensing.

The present invention provides an apparatus for non-contact distance measurement comprising: a source of energy;

means to focus said energy into a line (termed the common focal line) which, in operation, intersects a surface under examination at at least one point;

means for imaging said common focal line onto a plane in space (termed the image plane);

means for detecting features of the image on said image plane; and means for analysing a signal from said detector to provide a measurement of the distance from a reference point to the surface.

In another aspect, the present invention provides a method for non-contact distance measurement comprising focusing a source of energy into a line such that said line intersects a surface under examination at at least one point;

imaging the pattern generated by the intersection of said line and said surface onto a plane in space;

detecting the features of the image on said plane an analysing the signal from said detector to provide a measurement of the distance from a reference point to the surface.

The source of energy may ge visible light, radiowaves, microwaves and other electromagnetic radiation. It may also be a particle beam such as electron beam or proton beam. Further, the source of energy may be acoustic waves such as sound waves.

The means for detecting the point or points of intersection of the common focal line with the surface under examination may, in the case of an optical system, be a line, area or position detector arranged to capture part or all of the image in the detector plane. The point or points of intersection of the focal line with the surface under examination may be found by analysis of part or all of the image captured by the detector.

Note that the illumination and detection systems may incorporate some means for differentiating between energy that is scattered by the object and that which is reflected specularly by the object. One such method may be a polariser/analyser. The polariser being placed between the illumination and the object, and the analyser, or crossed polariser, being placed between the object and the detector.

The above system provides high resolution when utilised for microscopic distance measurement and good resolution when used over large distances. It is particularly suited to microscopic distances when visible illumination is combined with a highly astigmatic confocal microscope.

In a particular embodiment the present invention provides apparatus for non-contact distance measurement of microscopic distances utilizing a highly astigmatic confocal microscope including means for illuminating the surface to be examined and means for detecting reflected and/or scattered radiation from the surface characterized in that the means for illuminating the surface is arranged to produce a line of light and to focus said line so that it intersects the surface at at least one point, the means for detecting comprising a detector arranged to capture all or part of the image and means to determine the position of the brightest point or points of illumination scattered and/or reflected from the surface and to compute the distance of that point from a reference point. Apparatus according to the present invention has shown, under test, to be able to determine the height of a surface within a one micron resolution over a 5 mm range or, in another case, within a 0.1 micron resolution over a 1.4 mm range.

The description that follows uses terms generally employed to described apparatus in which the source of energy is visible light. It will be understood, however, that other forms of energy can be used in the apparatus provided appropriately analogous components are used in its construction.

In order that the nature of the invention may be better understood, preferred embodiments thereof are hereinafter described by way of example with reference to the accompanying drawings, in which:

FIG. 1 schematically illustrates the principles underlying the present invention;

FIG. 2 schematically illustrates a top view of an apparatus incorporating the present invention; and FIG. 3 is a schematic side view of the apparatus of FIG. 2.

In applying the invention two basic elements are used: an illumination system and a detection system.

Referring to FIG. 1, illumination provided to a focusing element 3 (object illumination) takes the form of a point source 1 extended in one direction i.e. a line of illumination. The wavelength of the illumination is not critical except insofar as it affects the resolution of the system, the range of materials that the apparatus can measure and the types of detectors that could ge used. A high quality optical element 3 focuses the line illumination into a line 4 in space. This line of focus 4 is termed the common line of focus of the system or, for short, the focal line.

An alternative to a line source of illumination and a spherically symmetric focusing element is to use a highly astigmatic optical element to image a point source into a line in space but this alternative requires more complicated optical design and makes the use of the same focusing element for both the illumination and detection system almost prohibitively difficult.

The focal line 4 is arranged relative to the surface 5 being measured such that line 4 intersects the surface 5 at at least one point. Another way of saying this is that the focal line 4 intersects the surface 5 and is not perpendicular to the average surface normal. Optimally, it is best that the intersection is only one point but with rough surfaces this may not be feasible. An imaging optical system 7 is arranged such that the focal line 4 provided from beamsplitter 2 is imaged onto the detector 6.

The detection system takes the form of a line, area or position detector 6. This may comprise either a pixel array or a linear position detector. The detector must be able to determine the position of the brightest point of illumination from the electrical output or to extrapolate that point from the rest of the image.

The basis of operation of the device is as follows: because of the angle between the focal line 4 and the surface 5 of the object whose distance is to be measured, only a limited number of points will lie on the focal line 4. These points will be characterized by maximum illumination intensity. Assuming a perfectly uniform surface, these points will give rise to more light than other points on the surface 5.

Because the focal line 4 of the illumination is coincident with the image on the detector 6, the points on the surface that lie on the focal line 4 will also be best imaged onto the line detector 6.

As a result of the above, the brightest spots imaged onto the detector 6 will correspond to those surface points coincident with the focal line 4. An analysis of the detector signals from detector 6 reveals the surface heights. This may be done via interpolation of the entire image rather than a line of the image.

The sensitivity of the system depends on the wavelength of the illumination used, the quality of the optics, the numerical aperture of the focusing element 3 and the angle the focal line 4 makes with the surface 5. For maximum height and lateral resolution it is necessary to use short wavelengths, high numeral apertures and diffraction limited optics.

Note that in FIG. 1 the same focusing element 3 has been used for both the illumination and detection systems. While this orientation is probably optimal, it is possible to have completely separate optical systems. In addition, this embodiment has been chosen to provide the focusing element 3 with a line of illumination. As mentioned previously, other embodiments could use a point source together with highly astigmatic optics to produce the line 4. In this latter case, it is almost but not quite obligatory to use separate optics for the illumination and detection optics.

FIGS. 2 and 3 show in more detail one embodiment of the invention. In this particular form of the invention a light emitting diode, laser diode or superadient diode 1 is used to provide illumination. Any one of such diodes may be used either alone or in combination with either of beam shaping optics (e.g. an anamorphic prism pair) or a single mode fibre pigtail. A diode as aforesaid with an integral fibre pigtail 2 is an easily handled point source of light suitable for this device and a pinhole is not needed. The cone of light emitted from the source is collimated by a lens 3 before passing through a cylindrical lens system 4. It should be noted that the cylindrical lens 4 could equally well have been placed before the collimator 3, after the beamsplitter 6 or even after the microscope objective. The next element in the system is the polarising or semisilvered beamsplitter 6. Beamsplitter 6 serves not only to separate the illumination optics from the detection optics, but also to split off only that light scattered by the object, for which the polarisation state of the light has changed. In some instances it may be advantageous to consider reflected light instead of scattered light in which case a quarter wave plate 12 may be placed between the polarising beamsplitter 6 and the microscope objective 5. The final optical element before object surface 8 is microscope objective 5 which focuses the illumination onto a line in space. It is the cylindrical lens element that is responsible for the formation of the line. In the absence of the cylindrical lens 4 the microscope objective would focus the light into a spot. Since the resolution of the system is determined primarily by the microscope objective, it is preferable to choose a high quality objective. It is more convenient to use a long working distance objective; short working distance objectives are typically surrounded by large metal mounts that make it difficult to obtain any but a shallow angle between the focal line and the sample surface. An objective having a numerical aperture of 0.5 and a working distance of approximately 10 mm is at present preferred for obtaining high resolution. The higher the numerical aperture of the objective, the higher the sensitivity of the instrument. The numerical aperture can theoretically vary between 0 and 1 although in practice it is unusual to go outside the range of 0.05 to 0.65.

The light returning from the sample surface is collected by the microscope objective 5 and that resulting from surface scattering is directed away from the illuminating system by the polarising beamsplitter 6. In the event that reflected light is of concern the quarter wave plate causes reflected light to be split off as well. Imaging optics 7 are arranged such that the focal line of the system is imaged onto a multi-element pixel array 9. For maximum height range, the entire length of the line should be imaged onto the detector. For maximum height resolution, only a small section of line should be imaged onto the whole length of the pixel array 9.

The sample surface 8 is placed such that the section of line imaged onto the pixel array 9 intersects the surface. It has been found that the employment of a polariser 10 can be advantageous in altering the intensity of the source thus giving greater control over image quality. Additionally, the inclusion of a polariser 11 has been useful in the elimination of stray reflections impinging on detector 9.

Another point to note is that in the arrangement described conventional optics are used. It is, however, feasible to employ reflective optics and/or holographic optical elements. As indicated earlier, analogous components may be used to construct an apparatus employing the principles of this invention but making use of other beams of energy such as radio waves, sound waves or particle beams. Quite clearly the optical elements would be of an entirely different construction as would the detector or detector array but the geometry would remain essentially the same.

Analysis of the detector data varies. In the case of a position detector the output, a voltage, is directly related to the distance between the measuring head and the object.

The analysis for a linear diode array detector is relatively simple. The signal on the linear array takes the form of a single moded intensity distribution. Real object lead to noise in the intensity distribution which necessitates the generation of a curve of best fit. By picking the peak of the curve, the distance between the measuring head and the object can be simply determined. By giving the high intensity signals an inordinately large weighting, it has been found, experimentally, that a better estimation of the distance between the measuring head and the object is possible.

There are three types of analysis that can be carried out on the signal from an urea diode detector array: statistical analysis of the intensities, shape analysis of the image and a combination of the two.

Successful statistical analysis to date include moments about the mean of the horizontal image lines, the vertical image lines and the area. The most successful statistical analysis to date was found to be the unnormalized kurtosis of the vertical columns raised to the power of two or more. The mean of the curve fitted through the resulting horizontal array yields a measure of the distance between the measuring head and the object. Resolutions as high as 0.1 microns have been obtained.

Possible shape analysis will depend on finding a set of outlines of the image for a range of intensities and picking the symmetrical center and averaging over the set. Possible curves to be fitted to the outline include: straight lines, hyerbolas, trigono metric lines.

By using both the shape and intensity distribution of the image in the detector plane all of the information in the image is being employed. One method utilises a second image obtained theoretically from a perfectly flat scattering surface. By moving the theoretical image across the read image while calculating the correlation between the two a curve is obtained. The maximum in the curve corresponds to the distance between a reference point and the surface being measured.

We claim:

1. An apparatus for non-contact distance measurement comprising:
   a source of energy;
   means for focusing said energy into a single common focal line which, in operation, is at a non-zero angle to the average surface under examination and intersects said surface at at least one point;
   means for imaging said common focal line onto an image plane in space;
   means for detecting features of the image on said image plane; and
   means for analyzing a signal from said detecting means to provide a measurement of the distance from a reference point to the surface.

2. An apparatus as claimed in claim 1 wherein said source of energy is electromagnetic radiation.

3. An apparatus as claimed in claim 2 wherein said source of energy is visible light.

4. An apparatus as claimed in claim 3 wherein the means for focusing said energy into a line is an astigmatic confocal microscope.

5. An apparatus as claimed in claim 3 wherein the source of energy is provided as a line of illumination.

6. An apparatus as claimed in claim 1 wherein the means for imaging the common focal line onto the image plane comprises a beamsplitter and an optical imaging system.

7. An apparatus as claimed in claim 1 wherein the means for detecting comprises a linear position detector.

8. An apparatus as claimed in claim 1 wherein the means for detecting comprises a pixel array.

9. An apparatus as claimed in claim 8 wherein the pixel array is an area array.

10. An apparatus as claimed in claim 4 wherein the energy source comprises a light emitting diode.

11. An apparatus as claimed in claim 10 wherein the energy source comprises a single mode fibre pigtail.

12. An apparatus as claimed in claim 10 wherein the energy source comprises beam shaping optics.

13. An apparatus as claimed in claim 12 wherein the beam shaping optics comprises an anamorphic prism pair.

14. An apparatus as claimed in claim 4, wherein the energy source comprises a laser diode.

15. An apparatus as claimed in claim 4, wherein the energy source comprises a superluminescent diode.

16. A method for non-contact distance measuring comprising:
   focusing a source of energy into a single line such that said line is at a non-zero angle to the average surface under examination and intersects said surface at at least one point;
   imaging the pattern generated by the intersection of said line and said surface onto a plane in space;
   detecting the features of the image on said plane; and
   analyzing a signal corresponding to the detected features to provide a measurement of the distance from a reference point to the surface.

17. A method as claimed in claim 16 wherein the source of energy is electromagnetic radiation.

18. A method as claimed in claim 17 wherein said electromagnetic energy is visible light.

* * * * *